(12) United States Patent
Hirsch

(10) Patent No.: US 9,374,269 B2
(45) Date of Patent: Jun. 21, 2016

(54) METHOD AND DEVICES FOR MATCHING DATA BETWEEN A MANAGER AND AN AGENT IN A MANAGEMENT NETWORK

(75) Inventor: Lucian Hirsch, München (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 770 days.

(21) Appl. No.: 11/667,226

(22) PCT Filed: Oct. 6, 2005

(86) PCT No.: PCT/EP2005/055042
§ 371 (c)(1),
(2), (4) Date: May 8, 2007

(87) PCT Pub. No.: WO2006/048362
PCT Pub. Date: May 11, 2006

(65) Prior Publication Data
US 2007/0276936 A1    Nov. 29, 2007

(30) Foreign Application Priority Data
Nov. 8, 2004  (EP) ..................... 04026479

(51) Int. Cl.
*H04L 12/24* (2006.01)
*H04Q 3/00* (2006.01)

(52) U.S. Cl.
CPC ............ *H04L 41/06* (2013.01); *H04L 41/0233* (2013.01); *H04L 41/046* (2013.01); *H04L 41/08* (2013.01); *H04Q 3/0087* (2013.01); *H04L 41/085* (2013.01); *H04L 41/0816* (2013.01)

(58) Field of Classification Search
USPC .......................................... 709/223
See application file for complete search history.

(56) References Cited

U.S. PATENT DOCUMENTS

| 5,987,018 | A  |   | 11/1999 | Freeburg et al. |
| 6,212,529 | B1 | * | 4/2001  | Boothby et al.  |
| 6,420,968 | B1 |   | 7/2002  | Hirsch          |
| 6,496,481 | B1 |   | 12/2002 | Wu et al.       |

(Continued)

FOREIGN PATENT DOCUMENTS

| EP | 0635952 | 1/1995 |
| EP | 0993149 | 4/2000 |

(Continued)

OTHER PUBLICATIONS

CA 2 331 899; Canadian Patent application; Hirsch et al, Nov. 18, 1999, Method and Communication System for Processing State Information in a Management Network Having Different Management Levels.*

(Continued)

*Primary Examiner* — Angela Nguyen
(74) *Attorney, Agent, or Firm* — Henry M. Feiereisen LLC.

(57) ABSTRACT

A method operates management network of a telecommunication network, which includes a manager and an agent who communication network using an object model. According to said object model, objects are assigned to classes of objects. The manager sends a request to the agent once the data has been matched. Following the request, the manager receives data from the agent (OMC1) exclusively on objects and/or alerts regarding which a change has been made since a specific moment in time.

23 Claims, 2 Drawing Sheets

(56) References Cited

U.S. PATENT DOCUMENTS

| | | |
|---|---|---|
| 6,629,506 B2 | 10/2003 | Park |
| 2001/0052006 A1* | 12/2001 | Barker et al. ............. 709/223 |
| 2002/0049764 A1* | 4/2002 | Boothby et al. ............. 707/100 |
| 2002/0191544 A1 | 12/2002 | Cheng et al. |
| 2006/0015617 A1 | 1/2006 | Castro et al. |

FOREIGN PATENT DOCUMENTS

| | | |
|---|---|---|
| JP | 4-199933 | 7/1992 |
| JP | 8-265317 | 10/1996 |
| JP | 8-340333 | 12/1996 |
| JP | 9-282253 | 10/1997 |
| JP | 2002-519874 | 7/2002 |
| JP | 2006-501700 | 1/2006 |
| WO | WO 99/59326 | 11/1999 |

OTHER PUBLICATIONS

Maguire R. et al. "Highspeed Im Motiilnetz Mit Standards Wie GRPS Surfen Nutzer Wei Im Festnetz-ISDN", Net-Zeitschrift Fuer Fommunickationsmanagement, Huthig Verlag, Heidelberg, DW, vol. 55, Nr. ½, 1. Jan. 2001, pp. 43-46, XP001001948, issn: 0947-4765, p. 44, middle column, lines 14-31.

Otsuki S et al: "Shared-Sequence Number ARQ Scheme for Multi-Media Wireless Communication Systems" 1999 IEEE 49$^{th}$. Vehicular Technology Conference, Houston, TX May 16-20, 1999, IEEE Vehicual Technology Conference, New York, NY: IEEE: US, vol. 2, Conf. 49, May 16, 1999 pp. 953-957, XP000903188 ISBN: 0-7803-5566-0, Abstract p. 954 left column, pp. 7-17.

"Universal Mobile Telecommunications Systems (UMTS): Medium Access Control (MAC) protocol specification (3GPP TS 25.321 version 5.0.0 Release 5) ETSI TS 125 321 V5.0.0 (@002-03)" ETSI 3GPP, Mar. 2002, pp. 1-53, XP002222164.

3GPP TR 25.950 V40.0 (Mar. 2001) 3$^{rd}$ Generation Partnership Project; Technical Specifiacation Group Radio Access Network; UTRA High Speed Downlink Packet Access (Release 4).

"Patent Abstract of Japan, JP2000-134169 issued May 12, 2000".

"Patent Abstract of Japan, JP07-038540 issued Feb. 7, 1995".

ETSI TS 132 602 V5.1.0 (Mar. 2003), Digital Cellular Telecommunications System (Phase 2+); Universal Mobile Telecommunications System (UMTS); Telecommunication Management; Configuration Mangement (CM); Basic Configuration Mangement Integration Reference Point (IRP) Information Service (3GPP TS 32.602 Version 5.10 Release 5), ETSI Standards, European Telecommunications Standards Institute, Sophia Antipolis, FR, BD. 3-SA5, Nr. V510, Mar. 2003, XP014010038, ISSN: 0000-0001.

ETSI TS 132 111-2 V4.6.0 (Mar. 2003), Universal Mobile Telecommunications System (UMTS); Telecommunication Management ; Fault Management; Part 2: Alarm Integration Reference Point; Information Service (3GPP TS 32-111-2 Version 4.6.0 Release 4), ETSI Standards, European Telecommunications Standards Institute, Sophia Antipolis, FR, Bd. 3-SA5, Nr. V460, Mar. 2003, XP014009881, ISSN: 0000-0001.

European Office Action , Mailed Jun. 8, 2007 issued in PCT Application EP2005/055042.

* cited by examiner

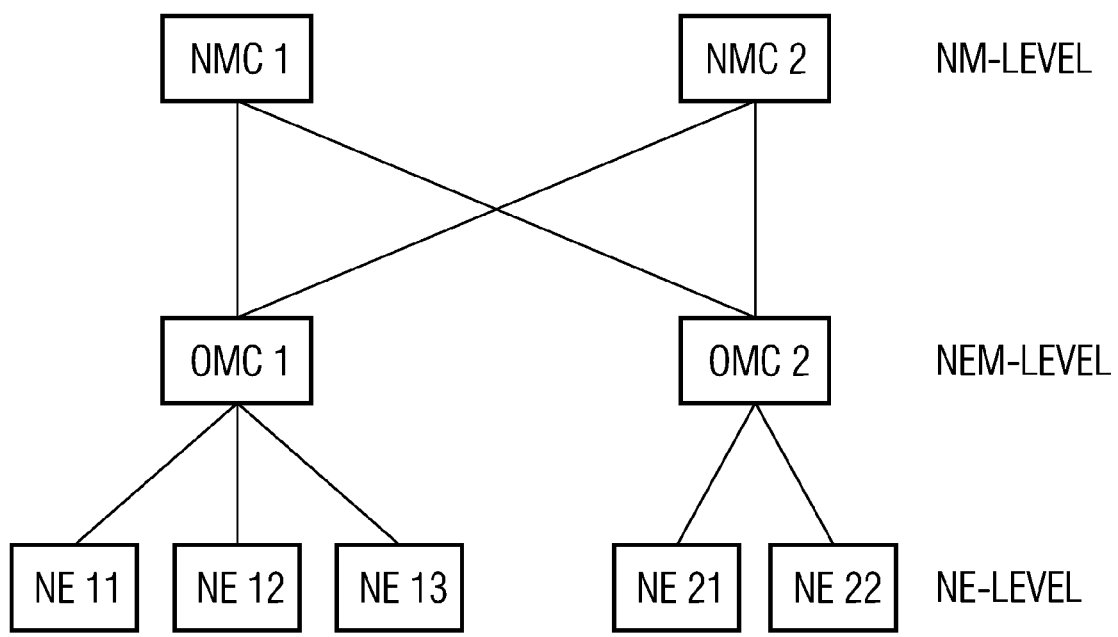

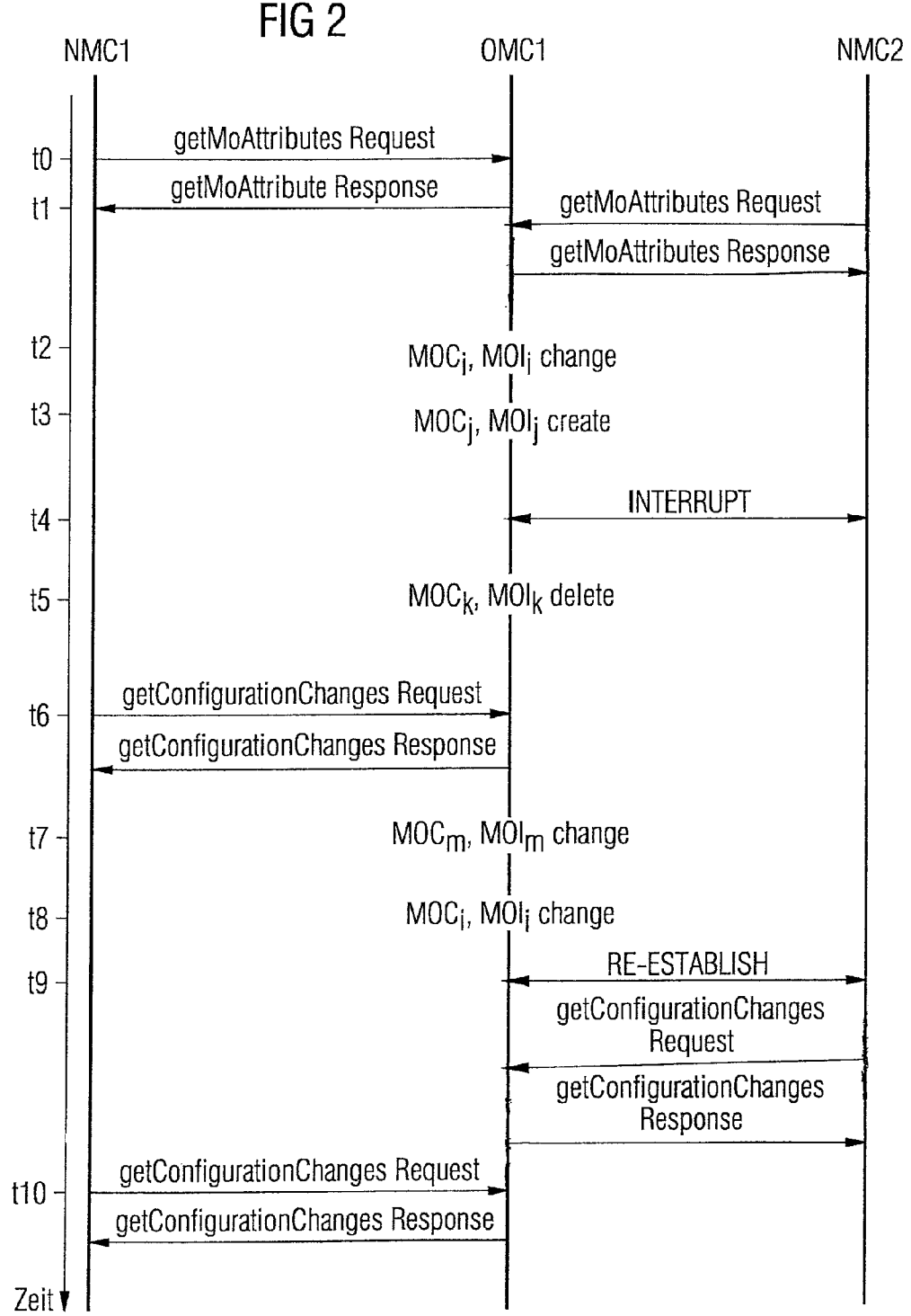

METHOD AND DEVICES FOR MATCHING DATA BETWEEN A MANAGER AND AN AGENT IN A MANAGEMENT NETWORK

CROSS REFERENCE OF THE INVENTION

The application is based on and hereby claims priority to PCT Application No. PCT/EP2005/055042 filed on Oct. 6, 2005 and European Application No. EP04026479 filed on Nov. 8, 2004, the contents of which are hereby incorporated by reference.

BACKGROUND OF THE INVENTION

The invention relates to a method for operating a management network of a telecommunications network, in which the manager and the agent communicate with each other using an object model.

TMN (TMN: Telecommunications Management Network) principle, a plurality of management layers exist for the management of a communication system—such as for example of a mobile radio communication system—with each layer, with the exception of the highest and lowest layer, having a dual function, namely a manager function and an agent function. In the managing system each layer except for the lowest exercises a manager function for the layer below it. In the managed system each layer except for the uppermost layer is given an agent function for the next-higher layer.

For network monitoring and control, managers start operations in which they send out what are referred to as "requests" which are executed by agents, and receive corresponding acknowledgements, referred to as "responses", from the agents. Elements of the telecommunications network, also referred to as resources of the telecommunications network, which in the TMN hierarchy exercise the role of an agent, detect relevant occurrences known as "events", for example alarms, generate the appropriate notifications, and transmit them to managers in the form of what are known as event reports to make possible an efficient network management system.

Network management can include functions such as fault management and/or configuration management and/or security management and/or accounting management and/or performance management. Network management is designed to provide suitable protection mechanisms for information distribution and -administration, so that if necessary a comprehensive picture of the network status is available and the individual objects of the telecommunications network can be efficiently monitored and configured.

Manager and agent communicate using what are known as management interfaces or manager-agent interfaces, which in an object-oriented environment are identified by a communication protocol, such as CMIP (Common Management Information Protocol) according to ITU-T X.711 or CORBA (Common Object Request Broker Architecture), and by an object model. Object models are used for modeling of resources of the telecommunications network, with these resources being subdivided during modeling into object classes.

Such interfaces are present for example between the network element management level on one side and the network element level on the other side. An example of network devices of this manager-agent interface are the operation and maintenance centers (OMC) on the network element management level side, as well as on network element level side devices such as base stations of the base station system (BSS) of a GSM mobile radio network, or base stations of other communication networks, for example Node Bs of a UMTS mobile radio network (UMTS) or radio access points of a WLAN (WLAN: Wireless Local Area Network) system for example in accordance with one of the IEEE 802.11 Standards.

Management interfaces or manager-agent interfaces also exist between the network management level on one side and the network element management level on the other side. Network Management Centers (NMC) represent an example of network devices for this manager-agent interface on the network management level side and Operation and Maintenance Centers (OMC) on the network element management level side, e.g. in the GSM network mentioned or in another mobile radio or telecommunications network.

SUMMARY OF THE INVENTION

One possible object of the invention is to demonstrate an efficient method for operation of a management network of the type mentioned at the start. Furthermore a suitable manager and also an agent and a management network for executing the method are to be presented.

The inventor proposes a method for operating a management network of a telecommunications network, including a manager and an agent, the manager and the agent communicate with each other using an object model. In accordance with the object model object classes are assigned to objects. The manager sends to the agents a request for data matching or the agent receives from the manager a request for data matching. In response to the request, the manager receives information from the agent exclusively about objects and/or alarms in relation to which a change has occurred since a specific point in time, or the agent sends this information to the manager.

The manager and the agent communicate with each other using an object model. The objects assigned the object classes of the object model are abstractions of physical or logical components, i.e. network resources, of the managed telecommunications network, the network resources are thus modeled as objects. Different types of requirement are possible in relation to an object, depending on the concrete embodiment of the object and its assignment to an object class.

An alarm exists because of an event. If an object establishes such an "alarm event", it sends an "alarm report" to report the alarm. The alarm is linked to that object that has sent the "alarm report". An alarm can have different states which can change. Furthermore an alarm can have attributes, referred to as alarm information, which can be changed.

The method allows a synchronization of information between a manager and an agent. A complete synchronization is not involved in this case, but rather a part synchronization, since not all objects and/or alarms are part of the synchronization but only those which fulfill the condition that a change has occurred in relation to them since a specific point in time. Not contained in them is information exclusively about objects and/or alarms, in relation to which since a specific point in time a change has occurred, and also information about objects and/or alarms, in relation to which no changes have occurred since the specific point in time. With the exception of this information about objects and/or alarms which have been unchanged since the specific point in time, other information can be sent as the information exclusively about objects and/or alarms in relation to which a change has occurred since a specific point in time in response to the request from the agent to the manager.

The information about objects and/or alarms, in relation to which a change has occurred since the specific point in time is preferably contained in a message, but it is also possible to divide it up between a plurality of messages. As well as the manager and the agent further devices can be part of the management network. It is possible for the method to be executed by an agent in relation to a plurality of managers, and by a manager in relation to a plurality of agents.

In a further development the specific point in time is the point in time of the last data matching between the manager and the agent requested by the manager. Thus, in the method, the manager is informed about changes that have occurred since the last synchronization requested by it. This last synchronization can involve a complete synchronization, or a part synchronization. The time of another event can be used as an alternative to the time of the last synchronization, meaning for example the point in time at which the connection between the manager and the agent is interrupted.

According to one embodiment, the request of the manager contains information about objects to which the information of the agent about objects and/or alarms, in relation to which a change has occurred since a specific point in time is to relate. This means that not all objects and/or alarms of the agent must be checked for changes, but only those that are indicated in the request of the manager. In relation to alarms the request of the manager can indicate that the changed alarms are only to relate to specific objects.

It is especially advantageous for the information about objects, in relation to which a change has occurred since the specific point in time, to include information about a change which has occurred since a specific point in time in respect of at least one attribute of at least one object known to the manager. The fact that an object is known to the manager can mean for example that the manager has stored information about this object, such as identification information of the object, the object class of the object, the attributes and the values of the attributes of the object for example and/or that the manager has already received messages about this object from the agent or has sent them to the agent. A change of an attribute can be implemented for example through the change of the values of the attribute, through the insertion of the attribute or through the deletion of the attribute. Preferably, within the framework of the part synchronization, the manager is informed about all attributes of all objects known to it changed since the specific point in time, if necessary which are specified in the request. The information about the change of an attribute of an object preferably includes: Identification information of the relevant object, identification information of the attribute and the current attribute value.

In addition or as an alternative it is advantageous for the information about objects, in relation to which a change has occurred since the specific point in time, to include information about at least one object unknown to the manager, which after the specific point in time has become relevant for the manager. The fact that an object is unknown to the manager, can mean for example that the manager has not stored any information about this object, and/or that the manager has not yet received any messages about this object from the agent or sent any to the agent. An object can be relevant for a manager if its is added to the set of the objects monitored by the manager, thus for example if a new device is installed which is to be monitored by the manager, if a device which was already known to the manager as an object is to be recorded as another object, if an object which from time to time was not monitored by the manager, e.g. because of on-site servicing, is to be monitored by the manager again. The information about an object previously unknown to the manager preferably includes: Identification information of the object, identification information of the attributes of the object and the current attribute values.

In addition or as an alternative it is advantageous for the information about objects, in relation to which a change has occurred since the specific point in time, to include information about at least one object known to the manager, which after the specific point in time has become irrelevant for the manager. An object can become irrelevant for a manager if it is removed from the set of objects monitored by the manager, thus for example if a device is removed from the telecommunications network, if a device which was previously already known to the manager as an object is to be detected as another object, if an object is not to be monitored from time to time by the manager, e.g. because of on-site servicing.

In a development the information about alarms in relation to which a change has occurred since the specific point in time, includes information about at least one received and/or generated alarm received since the specific point in time. This can for example relate to alarms which were generated by agents subordinate to the agent which represents an object monitored by the manager, and if necessary were forwarded by the agent to the manager. Furthermore this can also relate to alarms which were generated by the agent.

It is advantageous for the information about alarms, in relation to which a change has occurred since the specific point in time, to included information a change which has occurred since the specific point in time in respect of at least one state of at least one alarm. States of alarms can for example involve states such as "active" and "unacknowledged", i.e. the alarm cause is still present and the alarm has not yet been acknowledged, "active" and "acknowledged", i.e. the alarm cause is still present and the alarm has been acknowledged, "clear" and "unacknowledged", i.e. the alarm cause has been rectified but the alarm has not yet been acknowledged, "clear" and "acknowledged", i.e. the alarm cause has been rectified and the alarm has been acknowledged. In the last case the alarm can be deleted from the alarm list.

In an embodiment the request is sent periodically by the manager and/or after communication between the manager and the agent is re-established. If for example the communication between the manager and the agent is interrupted for a time, the manager, if it establishes that the communication fault has ended, can transmit a request for data matching to the agent. This request can also be overlaid on a sequence of requests which usually occur periodically. It is however also possible for the manager to send the request at any given point in time.

The manager for a telecommunications network features:
a unit to communicate with an agent using an object model, in accordance with which objects are assigned to object classes,
a unit to transmit a request for data matching to the agent,
a unit to receive in response to the request information from the agent exclusively about
objects and/or alarms in relation to which a change has occurred since a specific point in time.

The agent for a telecommunications network features:
a unit to communicate with a manager using an object model, in accordance with which objects are assigned to object classes,
a unit to receive a request for data matching from the manager,
a unit to transmit in response to the request information to the manager exclusively about
objects and/or alarms in relation to which a change has occurred since a specific point in time.

The management network can in addition to the manager and the agent, include further devices.

Both the manager and also the agent are especially suitable for executing the method, with this also being able to be applied to the embodiments and further developments.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1: a section of a management network of a mobile radio communication system, FIG. 2: a flow diagram of the method in accordance with one possible embodiment of the invention.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The section of a management network of a mobile radio communication system depicted in FIG. 1 has three levels NM-LEVEL (NM: Network Manager), NEM-LEVEL (NEM: Network Element Manager) and NE-LEVEL (NE: Network Element). Components of highest level NM-LEVEL are the network management centers NMC1 and NMC2, which are connected to the two operation and maintenance centers OMC1 and OMC2 of the middle level NEM-LEVEL. The two operation and maintenance centers OMC1 and OMC2 function as agents in relation to the network management centers NMC1 and NMC2. Operation and maintenance center OMC1 is connected to the three network elements NE11, NE12 and NE13 of the lowest NE-LEVEL, whereas the operation and maintenance center OMC2 is connected to the two network elements NE21 and NE22. Network elements NE11, NE12, NE13, NE21 and NE22 can for example be base stations or devices for control of base stations.

The network resources of the mobile radio communication system, such as the network elements NE11, NE12, NE13, NE21 and NE22 for example, are divided up within the framework of network management into object classes. An object model has been defined by 3GPP for communication over the interface between a network management center and an operation and maintenance center which includes the object classes ManagedElement and ManagedFunction for example, which are basic object classes with general attributes. Further object classes are for example gsmCell, utranCell, btsSiteManager, bssFunction, mscServerFunction, rncFunction, hIrFunction, virFunction, sgsnFunction and ggsnFunction.

Each object class is defined via basic operations, i.e. via commands which can be sent to objects of this object class from a manager, as well as via specific attributes, i.e. characteristics which can be interrogated by a manager and can be processed where necessary, and via specific messages, which can be sent from objects of the relevant object class within the framework of network management, as well as via the description of the meaning and of the behavior of the object class and its components. The object model used or the defined object classes between network management centers on one side and operation and maintenance centers on the other side are generic as a rule, to enable operation and maintenance centers of different manufacturers to be integrated. The reason for this is that a part of the manager's tasks, which the operation and maintenance centers undertake in relation to their subordinate network elements such as configuration management for example, depend on the concrete hardware and software embodiment of the network elements and are thereby proprietary. Since a network management center is often connected to a plurality of operation and maintenance centers of different manufacturers, a conversion is undertaken in the operation and maintenance centers of messages of the hardware-related object model of the OMC interface into messages of the generic object model of the OMC-NMC interface.

Each manager monitors one or more network resources to which it can send operations, i.e. requests, and from which is receives notifications. For this purpose it features a database in which the network resources relevant to it, i.e. monitored by it, are entered. For each network resource monitored by the manager an object instance, referred to below as an object, is created. If for example a new base station is installed, a new object corresponding to this base station is created and is assigned to the usual object class of the base stations. The new object is entered in the database of the manager. In a similar manner objects can also be deleted.

The optimum management of a telecommunications network requires that only the relevant event messages are forwarded from the subordinate agents as quickly as possible to the manager. Under normal conditions, i.e. if communication between agent and manager is functioning correctly, this can be done via a filter mechanism present in an agent, (for example for a CMIP-IP-based management interface with the aid of Event Forwarding Discriminators, abbreviated to EFDs, in accordance with ITU-T X.734 "Systems Management Event Report Management Function", or in a CORBA-based management interface with the aid of notification channels).

In order to obtain a current image of the network status, a manager can synchronize with agents the management information which it has stored. For this purpose synchronization procedures for data matching (also "referred to as alignment" procedures) for configuration data or alarms for example are used. The configuration data of an object represents the set of all attributes and their values, i.e. the totality of the characteristics of the object These types of synchronization processes are required in various cases, thus for example:
  a) After interruption and subsequent re-establishment of the communication between manager and agent.
  b) If specific agents, known as simple agents, do not generate configuration-related notifications (notifyObjectCreation/notifiyObjectDeletion/notifyAttributeValueChange, as for example defined in the 3GPP Standard TS 32.662 "Configuration Management (CM);Kernel CM information Service (IS), V6.3.0" or if managers do not evaluate such configuration-related notifications because a "real-time" synchronization is too much effort. In this case a synchronization must be started at least periodically by managers.
  c) If for other system reasons configuration-related notifications or also alarms can be lost, i.e. if an event-oriented synchronization is required, although the manager-agent communication was not interrupted.

Such procedures will usually be standardized, in order to allow synchronization between managers and agents of different manufacturers. For example the 3GPP Standard TS 32.602 [Configuration Management (CM); Basic CM Integration Reference Point (IRP): Information Service (IS), V6.0.0] defines an operation getMoAttributes, with which a manager can request the configuration data managed by the agent. For the synchronization of alarms 3GPP-Standard TS 32.111-2 [Fault Management; Part 2: Alarm Integration Reference Point (IRP): Information Service (IS)] defines an operation getAlarmList. These operations allow a manager to synchronize the entire management information, i.e. to undertake a complete data matching with the agent. If the information matching relates to configuration data, the manager receives in accordance with the related art the current values of all attributes of all objects which it monitors, together with identification information about the relevant object (MOI, Managed Object Instance) and identification information of the object classes of the relevant objects (MOC, Managed Object Class). If the data matching relates to alarms, the manager receives in accordance with the related art all alarms relevant for it. This complete information matching is also possible in relation to a specific network region. The manager receives the information regardless of whether this management information is already known to it. Since a manager cannot know which individual data has actually changed in the interim a device synchronization must be started. The consequence of the complete synchronization described is a very long, in almost all cases unnecessary synchronization duration, which for many operators, particularly after a relatively short interruption of manager-agent communication, is unacceptable This is, in view of the enormous volume of data to be synchronized, particularly at the NM-EM interfaces, of special significance, since if a network management center fails temporarily or if it does not evaluate any configuration-related notifications, it must be synchronized with all operation and maintenance centers.

The method is described below with reference to FIG. 2 as an example for the NM-EM management interface between the operation and maintenance center OMC1 and the network management centers NMC1 and NMC2 in relation to the synchronization of configuration data. The operation and maintenance center OMC1 administers for each of the two network management centers NMC1 and NMC2 a dynamic list, referred to below as the modification list, of the configuration modifications, in which identification information in the form of the complete name (DN=Distinguished Name) of all objects changed since the last synchronization is entered:

a) For an object, which is modified, since it is new i.e. an object which was previously neither contained in the database stored by the manager nor stored by the agent of the objects monitored by the manager, and was included in the database of the agent and is to be included in the database of the manager, a list entry is created in the list of modifications with the identification information of the object and the identifier "N" (New).

b) For a modified object, i.e. an object which is already included in the database stored by the manager and in the database stored by the agent of the objects monitored by the manager, a list entry is created in the modification list with the identification information of the object and the identifier "M" (Modified). A modification can be that a value of an attribute or of a plurality of attributes of the object having been modified, e.g. through modification of a local operator, or in an attribute value having been inserted or removed.

c) For an object which is modified since it was deleted, i.e. an object was previously contained in the database stored by the manager and in the database stored by the agent of the objects monitored by the manager, and was deleted from the database of the agent and is to be deleted from the database of the manager, a list entry is created in the modification list with the identification information of the object and the identifier "D" (Deleted).

When manager-agent communication is first established the relevant network management centers NMC1 or NMC2 send a request for execution of a complete synchronization to operation and maintenance center OMC1. Thus in FIG. 2, in which the time sequence is plotted at the bottom of the diagram, the network management center NMC1 sends at point in time t0 a standardized request getMoAttributes Request in accordance with 3GPP TS 32.602 to operation and maintenance center OMC1, and the network management center NMC2 sends such an operation at point in time t1. The operation and maintenance center OMC1 responds in each case with the message getMoAttributes Response standardized in accordance with 3GPP TS 32.602, which, as explained above, contains all the objects monitored by the relevant manager and the values of its attribute. After execution of this complete synchronization the modification list of the operation and maintenance center OMC1 is initialized for the relevant manager, so that an empty list of modifications is available for the relevant network management centers NMC1 or NMC2 after the message getMoAttributes Response has been sent.

After an interruption and restoration of manager-agent communication for example or if a manager detects that its configuration data might no longer be current, it only needs the modifications of the configuration data which have occurred since the last synchronization process to enable it to update its own database again. A method is executed via which the manager uses its experience of the changes occurring since the last synchronization, without superfluous information which has not changed since the last synchronization being transmitted by the agent. Because of the notification which is restricted to the modifications, this synchronization is referred to below as Delta synchronization. To initiate a Delta synchronization the network management centers NMC1 or NMC2 send a message getConfigurationChanges Request with the following parameters to the operation and maintenance center OMC1:

managerReference: this parameter uniquely identifies the relevant network management center NMC1 or NMC2;

baseObjectInstance: this optional parameter identifies an object as starting point in the object tree for the selection of the modified objects. All objects contained in the object tree under this reference object are investigated in accordance with the value of the following parameter scope;

scope: this optional parameter specifies, starting from the above-mentioned reference object, the objects subordinate to the manager-agent interface in the object tree for which the modified configuration data is to be synchronized. The parameter can assume the same values as for the standardized operation getMoAttributes: BASE OBJECT ONLY, Nth LEVEL SUBORDINATES, BASE Nth LEVEL, BASE ALL.

The parameters baseObjectInstance and scope thus enable the manager to restrict the objects which it is interested in within the framework of Delta synchronization. In particular the manager can use the topmost instance in the object tree as baseObjectInstance and the value BASE ALL as scope, i.e. all modified objects are to be taken into account for this Delta synchronization. This choice is made by the agent if the optional parameters baseObjectInstance and scope will not be used in the request message getConfigurationChanges Request.

The operation and maintenance center OMC1 searches for the objects in accordance with the parameters baseObjectInstance and scope in the modification list assigned to the respective network management center NMC1 or NMC2. After the end of the search process the operation and maintenance center OMC1 sends a response getConfigurationChanges Response to the respective Manager with the following content:

newObjectsList: This corresponds to a list with the new objects created since the last synchronization, corresponding to identifier "N" in the modification list, containing for each object the current object class, the object name in the form of the "distinguished name" and the attribute list, i.e. for each attribute the name of the attribute and the value of the attribute.

changedObjectsList: this corresponds to a list with the objects modified since the last synchronization, corresponding to identifier "M" in the modification list. Here too the current object class, the object name and the attribute list is specified for each object.

deletedObjectsList: this corresponds to a list with the objects deleted since the last synchronization, corresponding to identifier "D" in the modification list. Only the object class and the object name are specified for each object.

After the message getConfigurationChanges Response has been sent, the modification list assigned to the respective network management center NMC1 or NMC2 is initialized by the operation and maintenance center OMC1.

FIG. 2 shows an example of the case in which the described method of Delta synchronization is periodically initiated by network management center NMC1, whereas the request for executing the Delta synchronization is made by network management center NMC2 after re-establishment of the communication after a previous interruption to manager-agent communication. For example it is possible for network management center NMC1 not to evaluate any configuration-linked notifications (such as notifyObjectCreation/notifyObjectDeletion/notifyAttributeValueChange) whereas network management center NMC2 supports these notifications.

As already explained above, at points in time t0 and t1 there is a complete synchronization between the operation and maintenance center OMC1 and the network management center NMC1 or NMC2.

At point in time t2 in the step "$MOC_I$, $MOI_I$, change" one or more attributes of an object, identifying through $MOI_I$, (MOI: managed object instance) of the object class $MOC_I$ (MOC: managed object class), is modified by the OMC operator or by an automatic reconfiguration. The operation and maintenance center OMC1 enters the identification information of this object together with the identifier "M" into the modification lists assigned to the network management centers NMC1 and NMC2. Furthermore the operation and maintenance center OMC1 generates a message to give information about the modification made, preferably a standardized notifyAttributeValueChange Notification, which will only be evaluated by network management center NMC2 since network management center NMC1 does not evaluate any configuration-linked notifications. Network management center NMC2 updates its own database information in accordance with the notifyAttributeValueChange notification. The agent can however not recognize whether a manager actually evaluates this notification or not.

At point in time t3 in the step "$MOC_j$, $MOI_j$ create" a new object, identified by $MOI_j$ of object class $MOC_j$, is created by the OMC operator. Operation and maintenance center OMC1 enters the identification information of this object together with the identifier "N" into the modification lists assigned to the network management centers NMC1 and NMC2. Furthermore the operation and maintenance center OMC1 generates a message to give information about the entry created, preferably a standardized notifyObjectCreation notification, which will only be evaluated by network management center NMC2, i.e. network management center NMC2 updates its own database information accordingly. The agent can however again not recognize whether a manager actually evaluates this notification or not.

At point in time t4 in the step INTERRUPT the communication between the network management center NMC2 and the operation and maintenance center OMC1 is interrupted, e.g. through a temporary failure of the network management center NMC2.

At point in time t5 in the step "$MOC_k$, $MOI_k$ delete" an object, identified by $MOI_k$ of object class $MOC_k$, is deleted by the OMC operator. Operation and maintenance center OMC1 enters the identification information of this object together with the identifier "D" into the modification list assigned to the network management centers NMC1 and NMC2. Furthermore operation and maintenance center OMC1 generates a message giving information about the object deleted, preferably a standardized notifyObjectDeletion notification, which is lost since communication between network management center NMC2 and the operation and maintenance center OMC1 is interrupted.

The point in time t6 corresponds to a point in time of the periodic data matching between network management center NMC1 and operation and maintenance center OMC1, so that network management center NMC1, to update its configuration data, sends a request message getConfigurationChanges Request to operation and maintenance center OMC1. This request message getConfigurationChanges Request requests for synchronization all configuration data, which has been modified since the last synchronization initiated by the network management center NMC1 at point in time t0. Operation and maintenance center OMC1 finds in the modification list assigned to network management center NMC1 the object instances $MOI_I$, $MOI_j$ and $MOI_k$, for which modifications are communicated in the subsequent response message getConfigurationChanges Response sent by the operation and maintenance center OMC1 to network management center NMC1 as follows:

newObjectsList: <$MOC_j$, $MOI_j$, attribute list$_j$>
changedObjectsList: <$MOC_I$, $MOI_I$, attribute list$_I$>
deletedObjectsList: <$MOC_k$, $MOI_k$>.

The agent subsequently deletes all entries from the modification list of network management center NMC1.

At point in time t7 in the step "$MOC_m$, $MOI_m$ change", one or more attributes of an object, identified through $MOI_m$ of object class $MOC_m$, is changed. Operation and maintenance center OMC1 enters the identification information of this objects together with the identifier "M" into the modification list assigned to network management centers NMC1 and NMC2 and generates a notifyAttributeValueChange notification, which is ignored by network management center NMC1, while network management center NMC2 is still not accessible at this point in time.

At point in time t8 in step "$MOC_I$, $MO_I$ change" one or more attributes of the object, identified by $MOI_I$ of object class $MOC_I$, is changed again. Operation and maintenance center OMC1 enters the identification information of this object together with the identifier "M" into the modification list assigned to network management center NMC1. Operation and maintenance center OMC1 establishes that identification information of this object together with the identifier "M" is already present in the modification list of network management center NMC2 and consequently that no new entry is necessary. The following notifyAttributeValueChange notification is also lost since communication between network management center NMC2 and operation and maintenance center OMC1 is malfunctioning.

With multiple modification relating to the same object between two synchronizations in a modification list the procedure is as follows:

If an object is first modified and then deleted, the identification information of this object is only listed with the identifier "D" in the modification list.

If an object is first created and subsequently modified, the identification information of this objects is still listed with the identifier "N" in the modification list, since the object is new for the manager concerned.

If an object is first created and subsequently deleted, this object is removed from the respective modification list, this object would have no significance for the manager in the following synchronization.

If the same object is initially deleted and subsequently created again as a new object, the identification information of this object is listed in the modification list with the identifier "M", since the manager already knows this object but attribute values may have been changed by the new creation.

At point in time t9 the communication between network management center NMC2 and operation and maintenance center OMC1 is re-established. Network management center NMC2 then sends a request getConfigurationChanges Request to the agents for synchronization of the configuration data which has been modified since the last synchronization at point in time t1. The agent finds the objects concerned in the modification list assigned to network management center NMC2 and sends a message getConfigurationChanges Response to network management center NMC2 with the following content:

newObjectsList: <$MOC_j$, $MOI_j$, attribute list$_j$> changedObjectsList:

<$MOC_l$, $MOI_l$, attribute list$_l$>; This contains only the last modification at point in time t8, not the modification at point in time t2;

<$MOC_m$, $MOI_m$, attribute list$_m$> deletedObjectsList: <$MOC_k$, $MOI_k$>.

Operation and maintenance center OMC1 subsequently deletes all entries from the modifications list of network management center NMC2.

Although network management center NMC2 has received and evaluated the notifications at point in time t2 (notifyAttributeValueChange) and at point in time t3 (notifyObjectCreation), these modifications are also contained in the message getConfigurationChanges Response. This is advantageous since these notifications defined as optional in the 3GPP Standards (notifyAttributeValueChange and notifyObjectCreation) are not supported by some agents or managers. This means that the method described here is independent of the implementations in the agent or manager. Furthermore the agent does not know whether a configuration-related notification that it has generated will actually be evaluated by a manager.

At point in time t10 network management center NMC1 again starts its periodic data updating with the aid of a Delta synchronization for configuration data modified since point in time t6 by sending a message getConfigurationChanges Request. The response getConfigurationChanges Response of operation and maintenance center OMC1 contains the following information:

changedObjectsList:

<$MOC_l$, $MOI_l$, attribute list$_l$>

<$MOC_m$, $MOI_m$, attribute list$_m$>.

The other parts of the agent response i.e. newObjectsList and deletedObjectsList, are omitted or empty. Operation and maintenance center OMC1 subsequently deletes all entries from the modifications list of network management center NMC1.

The method can also be used for the Delta synchronization of a complete object tree (MIT=Management Information Tree, i.e. the totality of all objects) or only a part of an object tree. In the 3GPP Standard TS 32.602 [Configuration Management (CM); Basic CM Integration Reference Point (IRP): Information Service (IS), V6.0.0] the operation getContainment_, exists which brings about a complete synchronization of the object tree. For Delta synchronization of the object tree, an operation getContainmentChanges, comprising a request message getContainmentChanges Request of the manager and a response message getContainmentChanges Response of the agent, is used. Through the method for Delta synchronization of the object tree the manager receives a list of the new/modified/deleted objects without their attributes, i.e. the response message getContainmentChanges Response of the agent includes only the identification information of the relevant objects and their object class.

The method described is independent of the telecommunications system, it can be used for example in a mobile radio communication system, in the fixed network and in other systems. Furthermore the method is independent of the communication protocol between manager and Agent, allowing CMIP, CORBA, or other protocols to be used for example, and of the type of management interface, it can be used on an EM-NE, NM-EM, or other interfaces for example.

The method can be used for rapid synchronization of configuration data, since by restricting the transmission to modifications made since the last synchronization, the transmission of information known to the manager and thereby redundant can be dispensed with. Having regard to the usual volume of configuration changes by comparison with the total volume of configuration data, which with the previous standardized procedures can only be synchronized as a whole, the method described offers a way to reduce the synchronization duration, shorter by a least a factor of 10 in large networks for example. The method is especially of advantage if the agent and/or the manager does not support any configuration-related notifications. In such a case the Delta synchronization can be started periodically and not just after re-establishment of the manager-agent communication in order to ensure that a manager can bring its information up to date quickly and efficiently.

The previous method described for Delta synchronization of configuration data can also be used for the synchronization of alarms. In this case the response message getAlarmChanges Response of the agent to a request message getAlarmChanges Request of the manager contains the following information for Delta synchronization of alarms:

newObjectsList: all new alarms relevant for the manager, i.e. alarms which have arrived at the agent or were generated by it since the last synchronization;

changedObjectsList: all the alarms relevant for the manager of which the state has changed since the last synchronization, e.g. an active alarm has been set to the "cleared" state but not yet acknowledged by the operator, or it was acknowledge but not "cleared";

deletedObjectsList: all alarms relevant for the manager which were deleted since the last synchronization, e.g. since the state "cleared and acknowledged" was reached in the meantime.

A Delta synchronization of configuration data and alarms can also be executed.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for operating a management network of a communications network, the management network having a manager, an agent and an object model, by way of synchronizing information which is relevant for the manager to have an image of a current status of the communications network, the method comprising:
   using the object model, according to which objects are assigned to object classes, for communication between the manager and the agent;
   sending from the manager to the agent a request for synchronization of information which is relevant for the manager to have the image of the current status of the communications network; and
   sending from the agent to the manager, in response to the request, exclusively information relating to at least one of objects and alarms, which identifies all differences between the current status of the communications network and a status of the communications network at a specific point in time, that are relevant for the manager.

2. The method as claimed claim 1, wherein the specific point in time is the point in time when synchronization last occurred between the manager and the agent.

3. The method as claimed in claim 1, wherein
   a changed object known to the manager has an attribute that has changed since the specific point in time, and
   the information describes how the attribute of the changed object has changed since the specific point in time.

4. The method as claimed in claim 1, wherein
   a new object, which was previously unknown to the manager, has become relevant since the specific point in time, and
   the information identifies the new object.

5. The method as claimed in claim 1, wherein
   an old object, which is known to the manager, has become irrelevant since the specific point in time, and
   the information identifies the old object as being irrelevant.

6. The method as claimed in one claim 1, wherein
   a new alarm has been received or generated by the agent since the specific point in time, and
   the information identifies the new alarm.

7. The method as claimed in one claim 6, wherein
   a changed alarm has a state that has changed since the specific point in time, and
   the information identifies the state that has changed since the specific point in time.

8. The method as claimed in one claim 1, wherein the request is sent by the manager at a timing determined by at least one of a periodic timing and after communication between the manager and the agent has been re-established.

9. The method as claimed in claim 1, wherein the request identifies all objects relevant to the manager, and in response to the request:
   the agent investigates each object relevant to the manager;
   the agent sends the manager information relating to objects relevant to the manager, in which a modification has occurred; and
   the agent does not send the manager any information relating to objects relevant to the manager, in which a modification has not occurred.

10. The method as claimed in claim 1, wherein
   the specific point in time is a previous synchronization,
   after the previous synchronization, the agent generated notifications containing information about interim objects that were modified,
   the manager did not evaluate the notifications,
   the manager sent the request after the agent generated the notifications, and
   in response to the request, the agent sends the manager the information about the interim objects that were modified.

11. The method as claimed in claim 1, wherein the request for synchronization identifies the at least one of objects and alarms which are relevant for the manager.

12. The method as claimed in claim 11, wherein the identified at least one of objects and alarms are all of the at least one of objects and alarms or a subset of all of the at least one of objects and alarms.

13. The method as claimed in claim 11, wherein when the request for synchronization contains no information on the at least one of objects and alarms which are relevant for the manager, the request for synchronization identifies all of the at least one of objects and alarms.

14. A communications network, comprising:
   a manager to send a request for synchronization of information, which is relevant for the manager to have an image of a current status of the communications network; and
   an agent to communicate with the manager using an object model according to which objects are assigned to object classes, the agent having a receiver to receive from the manager, the request for synchronization of information, the agent having a transmitter to send the manager, in response to the request, exclusively information relating to at least one of objects and alarms, which identifies all differences between the current status of the communications network and a status of the communications network at a specific point in time, that are relevant for the manager.

15. The communications network as claimed in claim 14, wherein
   the request identifies all objects relevant to the manager, and
   in response to the request:
      the agent investigates each object relevant to the manager;
      the agent sends the manager information relating to objects relevant to the manager, in which a modification has occurred; and
      the agent does not send the manager any information relating to objects relevant to the manager, in which a modification has not occurred.

16. The communications network as claimed in claim 14, wherein
   the specific point in time is a previous synchronization,
   after the previous synchronization, the agent generated notifications containing information about interim objects that were modified, the manager did not evaluate the notifications,
the manager sent the request after the agent generated the notifications, and
in response to the request, the agent sends the manager the information about the interim objects that were modified.

17. A manager of a communications network, comprising:
a transmitter to send a request for synchronization of information, which is relevant for the manager to have an image of a current status of the communications network, the request for synchronization of information being sent to an agent with which the manager communicates using an object model according to which objects are assigned to object classes; and
a receiver to receive synchronization information from the agent, the synchronization information being sent in response to the request for synchronization of information, the synchronization information exclusively including information relating to at least one of objects and alarms, which identifies all differences between the current status of the communications network and a status of the communications network at a specific point in time, that are relevant for the manager.

18. The manager as claimed in claim 17, wherein the request identifies all objects relevant to the manager, and in response to the request:
the agent investigates each object relevant to the manager;
the agent sends the manager information relating to objects relevant to the manager, in which a modification has occurred; and
the agent does not send the manager any information relating to objects relevant to the manager, in which a modification has not occurred.

19. The manager as claimed in claim 17, wherein
the specific point in time is a previous synchronization,
after the previous synchronization, the agent generated notifications containing information about interim objects that were modified,
the manager did not evaluate the notifications,
the manager sent the request after the agent generated the notifications, and
in response to the request, the agent sends the manager the information about the interim objects that were modified.

20. An agent of a communications network, comprising:
a receiver to receive a request for synchronization of information, which is relevant for a manager to have an image of a current status of the communications network, the request for synchronization of information being received from the manager, the agent and the manager communicating using an object model according to which objects are assigned to object classes; and
a transmitter to transmit synchronization information to the manager, the synchronization information being sent in response to the request for synchronization of information, the synchronization information exclusively including information relating to at least one of objects and alarms, which identifies all differences between the current status of the communications network and a status of the communications network at a specific point in time, that are relevant for the manager.

21. The agent as claimed in claim 20, wherein
the request identifies all objects relevant to the manager, and
in response to the request:
the agent investigates each object relevant to the manager;
the agent sends the manager information relating to objects relevant to the manager, in which a modification has occurred; and
the agent does not send the manager any information relating to objects relevant to the manager, in which a modification has not occurred.

22. The agent as claimed in claim 20, wherein
the specific point in time is a previous synchronization,
after the previous synchronization, the agent generated notifications containing information about interim objects that were modified,
the manager did not evaluate the notifications,
the manager sent the request after the agent generated the notifications, and
in response to the request, the agent sends the manager the information about the interim objects that were modified.

23. A method for operating a management network of a communications network, the management network having a manager, an agent and a plurality of objects within the agent's scope of knowledge, the method comprising:
using an object model, according to which objects are assigned to object classes, for communication between the manager and the agent;
sending from the manager to the agent a request for synchronization, the request for synchronization being sent when the manager is not synchronized with the agent, such that the manager does not have the current status of all objects within the agent's scope of knowledge;
sending a response from the agent to the manager, in response to the request for synchronization, the response including information on all objects within the agent's scope of knowledge, which identifies all differences between the current status of the communications network and a status of the communications network at an immediately preceding synchronization, that are relevant for the manager; and
using the response at the manager to synchronize with the agent, such that the manager becomes synchronized with the agent and obtains the current status of all objects within the agent's scope of knowledge, the manager becoming synchronized using only the response, wherein
the request for synchronization indicates that all objects are relevant to the manager, and
in response to the request for synchronization:
the agent investigates each object relevant to the manager;
the agent sends the manager information relating to objects relevant to the manager, in which a modification has occurred with respect to the immediately preceding synchronization; and
the agent does not send the manager any information relating to objects relevant to the manager, in which a modification has not occurred with respect to the immediately preceding synchronization.

* * * * *